Patented Feb. 24, 1948

2,436,532

UNITED STATES PATENT OFFICE 2,436,532

PRODUCTION OF 4-KETO PIMELIC ACID

Fred G. Singleton, Pittsburgh, Pa., assignor to H. H. Robertson Company, Pittsburgh, Pa., a corporation of Pennsylvania No Drawing. Application February 24, 1945, Serial No. 579,689

4 Claims. (Cl. 260—537)

This invention relates to the production of 4-keto-pimelic acid.

The object of the invention is to provide a novel, practical method for the production of 4-keto-pimelic acid from furfural.

With this general object in view, and such others as may hereinafter appear, the invention consists in the method of making 4-keto-pimelic acid from furfural, hereinafter described and particularly defined in the claims at the end of this specification.

In general, the present invention contemplates a method of producing 4-keto-pimelic acid from furfural including the treatment of furfural for the production of furylacrylic acid and the subsequent splitting of the furan ring by treatment of the furylacrylic acid to form diethyl-4-keto-pimelate and the subsequent hydrolysis of this ester leading to the production of 4-keto-pimelic acid.

The first step in the present process contemplates the production of the furylacrylic acid and this object may be accomplished by the treatment of furfural with acetic anhydride and sodium acetate as represented in the following equation:

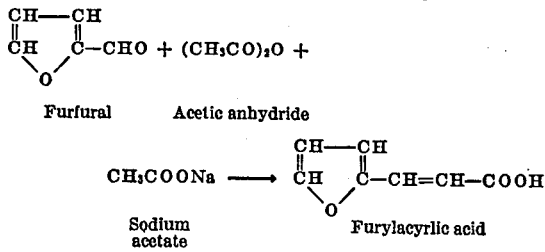

The second step comprises the conversion of the furylacrylic acid to 4-keto-pimelic acid and this process may be represented by the following general equations:

1. 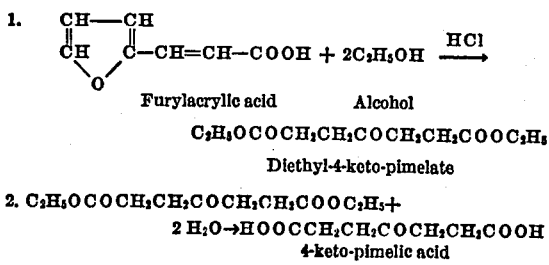

2. $C_2H_5OCOCH_2CH_2COCH_2CH_2COOC_2H_5 +$
$2 H_2O \rightarrow HOOCCH_2CH_2COCH_2CH_2COOH$
4-keto-pimelic acid The mechanism of the first reaction has not been completely elucidated but it is believed that it may take the course represented in the following equations:

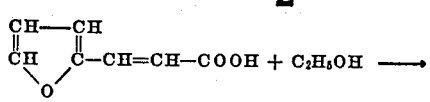

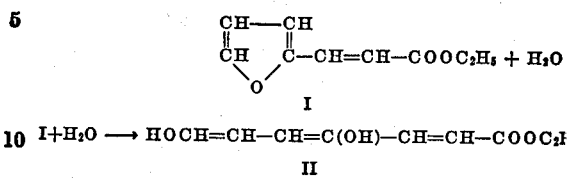

I + $H_2O \rightarrow HOCH=CH-CH=C(OH)-CH=CH-COOC_2H_5$
II

Rearranges

II $\rightarrow$ OHC-$CH_2$-$CH_2$-CO-CH=CH-COOC$_2$H$_5$
III

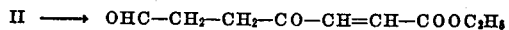

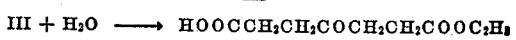

In carrying out the present process, the following procedure is recommended: One part by weight of furfural is heated with two parts by weight of acetic anhydride and one part by weight of fused anhydrous sodium acetate with stirring at a temperature of 140–145° C. for a period of eight hours. Upon completion of the reaction the product is a thick slurry from which the excess acetic anhydride and the acetic acid formed in the course of the reaction are recovered by distillation under vacuum. The solid brown residue is taken up in a large volume of hot water and boiled for one hour with decolorizing charcoal. The pH of the solution is then reduced to below four and preferably to about two by addition of sulfuric acid and the furylacrylic acid is allowed to crystallize. The crystals are filtered off, dried and dissolved in two and one-half parts by weight of ethyl alcohol. This solution is saturated with gaseous hydrogen chloride and refluxed for ten hours. Thereafter, the excess alcohol and hydrogen chloride are removed under vacuum. The residual crude diethyl-4-keto-pimelate is then hydrolyzed by boiling for twenty-four hours with two parts of water and one percent (based on the ester) of sulfuric acid. The alcohol formed in the reaction is condensed and recovered to be used in succeeding batches. The solution, which is dark in color, is treated hot with decolorizing carbon, filtered through a bed of the same material, and made up to twice the volume of the crude diethyl-4-keto-pimelate. The light yellow solution is cooled to 0° C. with stirring and the crystalline white 4-keto-pimelic acid is filtered off and dried. Its melting point was found to be 139–141° C. An additional crop of crystals may be obtained by evaporating the filtrate to a small volume and allowing it to cool. The product is obtained as well-defined white crystals sufficiently pure for practically all industrial purposes. One recrystallization from water raised the melting point to 141–142° C.

While it is preferred to follow the foregoing procedure, I wish to point out that variations may be made in certain particulars as follows:

The proportions of furfural, acetic anhydride and sodium acetate can be varied from one-half to two parts of sodium acetate and from one to three parts of acetic anhydride, to one part of furfural.

The reaction may be carried out by heating within a range of from 120° C. to 160° C.

The time of the reaction may be varied within reasonable limits but the recommended range is from seven to eleven hours. Heating for too short a time as well as heating for too long a time reduces the yield.

With respect to the decolorizing steps, it is preferred to employ both, but if found desirable the first step may be omitted. In addition to charcoal, various porous silica earths such as fuller's earth, infusorial earth, diatomaceous earth, and other adsorbents such as activated alumina may be used.

Instead of sulfuric acid, sufficient of any of the mineral acids to free all of the furylacrylic acid may be used.

Instead of utilizing vacuum for the removal of the excess alcohol and hydrogen chloride, this may be accomplished by distilling at atmospheric pressure.

While it is preferred to use sulfuric acid in an amount of about one percent by weight based on the ester, other catalysts may be used if found advantageous, and while it is not recommended the hydrolysis may be carried out by other methods well known to those skilled in the art.

Instead of ethyl alcohol, other alcohols may be used with the formation of the corresponding esters instead of the diethyl-4-keto-pimelate.

The present process has among others the following advantages over methods of producing 4-keto-pimelic acid heretofore proposed.

In the production of furylacrylic acid previous investigators have dissolved the reaction product, including acetic acid and acetic anhydride, in an alkaline solution and it was then necessary to free the furylacrylic acid from the resulting salt by adding a large amount of mineral acid. The present method is an improvement for commercial use in that the alkali and acid are not required and the acetic anhydride and acetic acid are recovered easily and practically quantitatively for subsequent use.

By the use of the present method, furylacrylic acid melting at 140–141° C. of sufficient purity for use without further purification is obtained.

In the production of 4-keto-pimelic acid the crude diethyl-4-keto-pimelate is used without purification. This not only permits the omission of two steps from prior processes but increases the yield since there is always some 4-keto-pimelic acid formed in the esterification reaction by hydrolysis of the ester. This free acid is non-volatile and is lost if the ester is purified by distillation. Washing also reduces the yield because of the appreciable solubility of the ester in water.

The hydrolysis of the ester to the free acid is carried out by acid hydrolysis instead of by alkaline saponification. This method has a number of advantages:

Better isolated yield. It is probable that the yields in the two processes are substantially quantitative. However, it is easier to recover the acid from the acid solution because only small amounts of extraneous substances are present. It is difficult to separate the acid from the large amount of salts which are present when alkaline saponification followed by neutralization by acid is resorted to. At least one purification step is saved by using the acid hydrolysis.

Since the cost of sodium hydroxide and hydrochloric acid is saved the process is cheaper.

The alcohol formed during the hydrolysis is recovered, purified by distillation and returned to the esterification step.

Having thus described the invention, what is claimed is:

1. In the method of making 4-keto pimelic acid in which furfural is reacted with fused sodium acetate and acetic anhydride in a step for producing furylacrylic acid, the furylacrylic acid is reacted with an alcohol in the presence of hydrogen chloride in a step for producing an ester of 4-keto pimelic acid, and 4-keto pimelic acid is recovered from said ester, the improvement which comprises, dissolving in hot water the reaction products containing impure furylacrylic acid from the furylacrylic acid producing step, acidifying the resulting heated solution with a mineral acid to free substantially all of the furylacrylic acid, cooling the acidified solution to form crystals of furylacrylic acid in a mother liquor, separating said crystals from the major portion of the cooled mother liquor to recover an impure product containing said crystals and residual impurities from said mother liquor, employing said impure product in the ester producing step to produce an impure ester of 4-keto pimelic acid, acid hydrolyzing said impure ester to produce a heated aqueous solution containing dissolved 4-keto pimelic acid, cooling the last-mentioned solution to produce crystals of 4-keto pimelic acid in a mother liquor and separating the last mentioned crystals from their mother liquor to obtain an increased yield of substantially pure 4-keto pimelic acid.

2. In the method of making 4-keto pimelic acid in which furfural is reacted with fused sodium acetate and acetic anhydride in a step to produce furylacrylic acid, the furylacrylic acid is reacted with an alcohol in the presence of hydrogen chloride in a step to produce an ester of 4-keto pimelic acid, and 4-keto pimelic acid is recovered from said ester, the improvement which comprises, distilling excess acetic anhydride and acetic acid formed in the furylacrylic acid producing step from the reaction products thereof to produce an impure residue containing furylacrylic acid, dissolving the impure residue in hot water, acidifying the resulting heated solution with a mineral acid to free substantially all of the furylacrylic acid, cooling the acidified solution to form crystals of furylacrylic acid in a mother liquor, separating said crystals from the major portion of the cooled mother liquor to recover an impure product containing said crystals and residual impurities from said mother liquor, employing said impure product in the ester producing step, distilling excess hydrogen chloride and alcohol from the reaction products of said ester producing step to produce an impure ester of 4-keto pimelic acid, acid hydrolyzing said impure ester to produce a heated aqueous solution containing dissolved 4-keto pimelic acid, decolorizing the last-mentioned solution and then cooling to produce crystals of 4-keto pimelic acid in a mother liquor and separating the last-mentioned crystals from their mother liquor to obtain an increased yield of substantially pure 4-keto pimelic acid.

3. In the method of making 4-keto pimelic acid in which furfural is reacted with fused sodium acetate and acetic anhydride in a step for producing furylacrylic acid, the furylacrylic acid is reacted with ethyl alcohol in the presence of hydrogen chloride in a step for producing the diethyl ester of 4-keto pimelic acid, and 4-keto pimelic acid is recovered from said ester, the improvement which comprises, dissolving in hot water the reaction product containing impure furylacrylic acid from the furylacrylic acid producing step, acidifying the resulting heated solution with a mineral acid to free substantially all of the furylacrylic acid, cooling the acidified solution to form crystals of furylacrylic acid in a mother liquor, separating said crystals from the major portion of the cooled mother liquor to recover an impure product containing said crystals and residual impurities from said mother liquor, employing said impure product in the ester producing step to produce an impure diethyl ester of 4-keto pimelic acid, acid hydrolyzing said impure ester to produce a heated aqueous solution containing dissolved 4-keto pimelic acid, cooling the last-mentioned solution to produce crystals of 4-keto pimelic acid in a mother liquor and separating the last mentioned crystals from their mother liquor to obtain an increased yield of substantially pure 4-keto pimelic acid.

4. In the method of making 4-keto pimelic acid in which furfural is reacted with fused sodium acetate and acetic anhydride in a step for producing furylacrylic acid, the furylacrylic acid is reacted with ethyl alcohol in the presence of hydrogen chloride in a step for producing the diethyl ester of 4-keto pimelic acid, and 4-keto pimelic acid is recovered from said ester, the improvement which comprises, distilling excess acetic anhydride and acetic acid formed in the furylacrylic acid producing step from the reaction products thereof to produce an impure residue containing furylacrylic acid, dissolving the impure residue in hot water, acidifying the resulting heated solution with a mineral acid to free substantially all of the furylacrylic acid, cooling the acidified solution to form crystals of furylacrylic acid in a mother liquor, separating said crystals from the major portion of the cooled mother liquor to recover an impure product containing said crystals and residual impurities from said mother liquor, employing said impure product in the ester producing step, distilling excess hydrogen chloride and alcohol from the reaction products of said ester producing step to produce an impure diethyl ester of 4-keto pimelic acid, acid hydrolyzing said impure ester to produce a heated aqueous solution containing dissolved 4-keto pimelic acid, decolorizing the last-mentioned solution and then cooling to produce crystals of 4-keto pimelic acid in a mother liquor and separating the last mentioned crystals from their mother liquor to obtain an increased yield of substantially pure 4-keto pimelic acid.

FRED G. SINGLETON.

REFERENCES CITED

The following references are of record in the file of this patent:

UNITED STATES PATENTS

| Number | Name | Date |
| --- | --- | --- |
| 2,290,926 | Weisberg et al. | July 28, 1942 |
| 2,363,011 | Britton et al. | Apr. 3, 1945 |
| 2,373,583 | Loder | Apr. 10, 1945 |

OTHER REFERENCES

Baeyer, Berichte (Deutsch. Chem. Gesell.), vol 10, page 357, (1877).

Marckwald, Berichte (Deutsch. Chem. Gesell.), vol. 20, pages 2811–2814 (1887).

Gibson et al., Am. Chem. Journal, vol. 12, page 314.

Robinson et al., Jour. Chem. Soc. (London), 1927, page 2413.

Marckwald, Beilstein (4th ed., 1934), vol. 18, page 300; ibid., (4th ed., 1921), vol. 3, page 806.